US012312832B1

(12) United States Patent
Liao

(10) Patent No.: US 12,312,832 B1
(45) Date of Patent: *May 27, 2025

(54) CLEANING METHOD OF POOL CLEANING EQUIPMENT AND POOL CLEANING EQUIPMENT

(71) Applicant: Aiper Global Pte. Ltd., Singapore (SG)

(72) Inventor: Jinhui Liao, Singapore (SG)

(73) Assignee: Aiper Global Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,050

(22) Filed: Jan. 17, 2025

Related U.S. Application Data

(63) Continuation of application No. 18/950,444, filed on Nov. 18, 2024.

(30) Foreign Application Priority Data

Sep. 11, 2024 (CN) .......................... 202411269343.8

(51) Int. Cl.
*E04H 4/16* (2006.01)
*G06T 7/00* (2017.01)

(52) U.S. Cl.
CPC ............. *E04H 4/16* (2013.01); *G06T 7/0002* (2013.01); *G06T 2207/30* (2013.01)

(58) Field of Classification Search
CPC ...... E04H 4/16; G06T 7/0002; G06T 2207/30
USPC ................. 4/490, 492, 488; 482/55
See application file for complete search history.

(56) References Cited

U.S. PATENT DOCUMENTS

| | | | |
|---|---|---|---|
| 11,493,932 B2 * | 11/2022 | Regev | G05D 1/0274 |
| 2013/0007954 A1 * | 1/2013 | Sutton | F16K 31/52483 4/490 |
| 2016/0319559 A1 * | 11/2016 | Durvasula | G05D 1/223 |
| 2023/0090852 A1 * | 3/2023 | Roy | E04H 4/129 4/493 |
| 2024/0052664 A1 * | 2/2024 | Green | E04H 4/169 |
| 2024/0185396 A1 * | 6/2024 | Hatamizadeh | G06T 5/60 |

FOREIGN PATENT DOCUMENTS

| | | | | |
|---|---|---|---|---|
| AU | 2016329776 A1 * | 5/2018 | | E04H 4/1654 |
| CN | 114109095 B * | 9/2023 | | |
| DE | 102019214657 A1 * | 3/2020 | | E04H 4/1654 |
| EP | 3825494 A1 * | 5/2021 | | E04H 4/1654 |
| EP | 3012386 B1 * | 6/2023 | | E04H 4/1263 |

* cited by examiner

Primary Examiner — Lori L Baker
(74) Attorney, Agent, or Firm — IPRO, PLLC

(57) ABSTRACT

The application relates to a cleaning method of pool cleaning equipment and the pool cleaning equipment. The method includes: acquiring current image information of a target cleaning area; identifying dirty data based on the current image information; switching the cleaning mode of the pool cleaning equipment according to the dirty data. By switching the cleaning mode of the pool cleaning equipment in real time, the workload and the energy consumption of the pool cleaning equipment are reduced and the cleaning efficiency of the pool cleaning equipment is improved.

20 Claims, 4 Drawing Sheets

CLEANING METHOD OF POOL CLEANING EQUIPMENT AND POOL CLEANING EQUIPMENT

This application is a continuation of U.S. application Ser. No. 18/950,444 filed on Nov. 18, 2024 which claims the priority to and benefit of Chinese Patent Application No. 2024112693438, filed on Sep. 11, 2024. For all purposes under the U.S. law, the entire disclosure of the above applications is incorporated by reference as part of the disclosure of this application.

FIELD OF THE INVENTION

The application relates to the technical field of pool cleaning, in particular to a cleaning method of pool cleaning equipment and pool cleaning equipment.

BACKGROUND OF THE INVENTION

With the development of technology, the demand for pool cleaning equipment is increasing; the pool cleaning equipment refers to the equipment for cleaning the pool, specifically, the pool cleaning equipment can be a swimming pool robot; the existing pool cleaning equipment usually achieves full coverage cleaning in the cleaning process, specifically, the full coverage cleaning refers to cleaning every place in the pool. Although the full coverage cleaning can effectively clean the pool, if it is performed every time, the workload of pool cleaning equipment is heavy, resulting in low cleaning efficiency and high energy consumption of pool cleaning equipment.

SUMMARY OF THE INVENTION

In view of the above problems in the prior art, the purpose of the application is to reduce the workload and the energy consumption and improve the cleaning efficiency of the pool cleaning equipment by switching the cleaning mode of the pool cleaning equipment in real time.

In order to solve the above problems, the application provides a cleaning method of pool cleaning equipment, which includes the following steps: acquiring current image information of a target cleaning area; identifying dirty data based on the current image information; and switching cleaning mode of the pool cleaning equipment according to the dirty data.

In one possible embodiment, the dirty data includes dirty degree information and dirty position information.

In one possible embodiment, the dirty degree information includes type, occupied area, occupied volume or quantity of pollutants.

In one possible embodiment, the cleaning mode includes a first cleaning mode and a second cleaning mode, or the first cleaning mode and a third cleaning mode; the switching cleaning mode of the pool cleaning equipment according to the dirty data includes: switching the cleaning mode of the pool cleaning equipment from the first cleaning mode to the second cleaning mode or the third cleaning mode according to the dirty degree information.

In one possible embodiment, the second cleaning mode includes performing a local path planning based on the dirty position information, and controlling the pool cleaning equipment to move from a currently located area to an area where dirt is located for fixed-point cleaning based on the local path planning.

In one possible embodiment, the first cleaning mode includes a main cleaning mode, the second cleaning mode includes a directional cleaning mode and the third cleaning mode includes a full-coverage cleaning mode.

In one possible embodiment, the performing the local path planning based on the dirty position information includes updating map data of pool based on the dirty position information, and performing the local path planning based on the updated map data.

In one possible embodiment, the local path includes a path of the pool cleaning equipment traveling along an edge of the pool or a path closest to the dirt for the pool cleaning equipment.

In one possible embodiment, the cleaning method further includes controlling the pool cleaning equipment to return to an area to which the first cleaning mode is applied after the second cleaning mode or the third cleaning mode is completed.

In one possible embodiment, the identifying the dirty data based on the current image information includes comparing the current image information with preset image information.

In one possible embodiment, the identifying the dirty data based on the current image information includes: performing feature extraction on the current image information to acquire a plurality of target feature points; performing semantic segmentation on the current image information when the number of the plurality of target feature points is greater than a preset feature number, and determining target semantic information except pool wall information and pool bottom information; and performing semantic recognition on the target semantic information to determine the dirty data.

In one possible embodiment, in the first cleaning mode, a distance between two adjacent parallel travelling paths of the pool cleaning equipment is greater than a cleaning width of the pool cleaning equipment during travelling and less than a width of the target cleaning area.

In one possible embodiment, in the third cleaning mode, a distance between two adjacent parallel travelling paths of the pool cleaning equipment is less than or equal to the cleaning width during the travelling of the pool cleaning equipment.

In one possible embodiment, the target cleaning area includes an area to be cleaned of the pool cleaning equipment, an area in front sensed by the pool cleaning equipment, or an entire pool area.

In another aspect, the application provides a pool cleaning equipment includes: an image acquisition unit configured to acquire current image information of a target cleaning area; a processing unit configured to identify dirty data based on the current image information; and a control unit configured to control the pool cleaning equipment to switch cleaning mode according to the dirty data.

In one possible embodiment, the cleaning mode includes a first cleaning mode and a second cleaning mode, or the first cleaning mode and a third cleaning mode, and the control unit is configured to control the pool cleaning equipment to switch from the first cleaning mode to the second cleaning mode or the third cleaning mode according to the dirty data.

In one possible embodiment, the first cleaning mode includes a main cleaning mode, the second cleaning mode includes a directional cleaning mode and the third cleaning mode includes a full-coverage cleaning mode.

In one possible embodiment, in the first cleaning mode, a distance between two adjacent parallel travelling paths of the pool cleaning equipment is greater than a cleaning width of the pool cleaning equipment during travelling and less than a width of the target cleaning area.

In one possible embodiment, in the third cleaning mode, a distance between two adjacent parallel travelling paths of the pool cleaning equipment is less than or equal to the cleaning width during the travelling of the pool cleaning equipment.

In one possible embodiment, in the second cleaning mode, the control unit is configured to perform a local path planning based on the dirty position information, and control the pool cleaning equipment to move from a currently located area to an area where dirt is located for fixed-point cleaning based on the local path planning.

In one possible embodiment, the control unit is configured to compare the current image information with preset image information to identify the dirty data.

In one possible embodiment, the control unit is configured to: perform feature extraction on the current image information to acquire a plurality of target feature points; perform semantic segmentation on the current image information when the number of the plurality of target feature points is greater than a preset feature number, and determine target semantic information except pool wall information and pool bottom information; and perform semantic recognition on the target semantic information to determine the dirty data.

In one possible embodiment, the target cleaning area includes an area to be cleaned of the pool cleaning equipment, an area in front sensed by the pool cleaning equipment, or an entire pool area.

In another aspect, the application also provides an electronic device, which includes a processor and a memory, wherein at least one instruction or at least one program is stored in the memory, and the at least one instruction or the at least one program is loaded and executed by the processor to realize the cleaning method of the pool cleaning equipment.

In another aspect, the application also provides a non-transitory computer-readable storage medium storing computer-readable instructions that cause a processor to: acquire current image information of a target cleaning area; identify dirty data based on the current image information; and switch cleaning mode of the pool cleaning equipment according to the dirty data.

Due to the above technical solution, the cleaning method of the pool cleaning equipment provided by the application has the following beneficial effects.

By acquiring the current image information of the target cleaning area, and identifying the dirty data in the target cleaning area based on the current image information, and switching the cleaning mode of the pool cleaning equipment according to the dirty data, the cleaning mode of the pool cleaning equipment can be switched in real time, so that the cleaning mode of the pool cleaning equipment can be matched with the dirty data in the target area, and the ineffective work of the pool cleaning equipment can be avoided, thereby reducing the workload and the energy consumption and improving the cleaning efficiency of the pool cleaning equipment.

BRIEF DESCRIPTION OF DRAWINGS

In order to explain the technical solution of the application more clearly, the drawings needed in the description of the embodiments or the prior art will be briefly introduced below. Obviously, the drawings in the following description are only some embodiments of the application, and other drawings can be acquired according to these drawings without creative work for person skilled in the art.

DETAILED DESCRIPTION OF THE INVENTION

In the following, the technical solution in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by the person skilled in the art without creative work belong to the protection scope of this application.

"One embodiment" or "an embodiment" as used herein refers to a specific feature, structure or characteristic that can be included in at least one implementation of this application. In the description of this application, it should be understood that the azimuth or positional relationship indicated by the terms "upper", "lower", "left", "right", "top" and "bottom" is based on the azimuth or positional relationship shown in the attached drawings, and is only for the convenience of describing this application and simplifying the description, and does not indicate or imply that the referred device or element must have a specific orientation, be constructed and operated in a specific orientation, therefore, In addition, the terms "first" and "second" are only used for descriptive purposes, and cannot be understood as indicating or implying relative importance or implicitly indicating the number of indicated technical features. Therefore, the features defined as "first" and "second" can include one or more of these features explicitly or implicitly. Moreover, the terms "first" and "second" are used to distinguish similar objects, and are not necessarily used to describe a specific order or precedence. It should be understood that the data so used can be interchanged under appropriate circumstances, so that the embodiments of the application described herein can be implemented in other orders than those illustrated or described herein.

Figure 1:
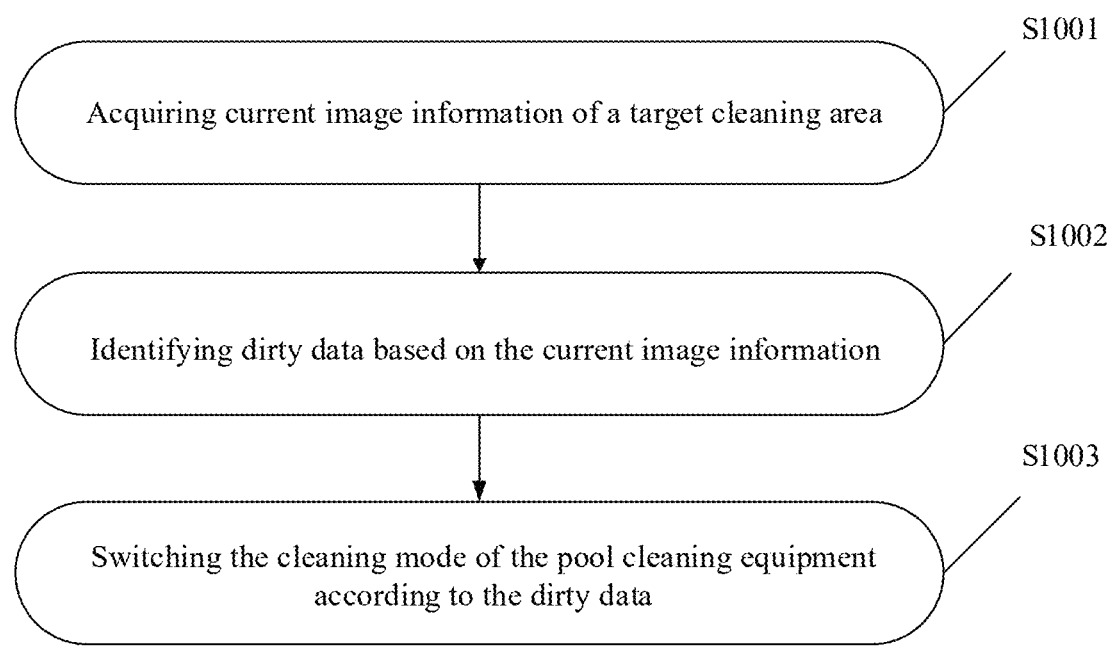
FIG. 1 is a schematic flowchart of a cleaning method of pool cleaning equipment according to an embodiment of the present application.

Referring to FIG. 1, a cleaning method of pool cleaning equipment provided by an embodiment of the present application is introduced, which includes the following steps.

S1001, the current image information of a target cleaning area is acquired. The target cleaning area is the area to be cleaned by the pool cleaning equipment; Specifically, the target cleaning area can be the area in front of the pool cleaning equipment, and the target cleaning area can also be the whole pool area; the current image information refers to the image information collected at the current time node.

In one possible embodiment, the pool cleaning equipment includes an image acquisition device and a control device. The current image information is collected by the image acquisition device and sent to the control device. The image acquisition device can be a camera or a laser radar.

S1002, the dirty data is identified based on the current image information. The dirty data represents all kinds of dirty information in the target cleaning area.

In one possible embodiment, the dirty data includes dirty degree information and dirty position information.

In one possible embodiment, the dirty degree information includes the types, occupied area, occupied volume or quantity of pollutants.

In one possible embodiment, the types of pollutants include, but are not limited to, sediment pollutants, plastic pollutants and large pollutants.

In one possible embodiment, the different types of pollutants correspond to the different dirty degree information. For example, the occupied area is used to evaluate the dirty degree of the sediment pollutants, and the occupied volume or the quantity is used to evaluate the dirty degree of the plastic pollutants and large pollutants.

S1003, the cleaning mode of the pool cleaning equipment is switched according to the dirty data.

In one possible embodiment, by acquiring the current image information of the target cleaning area, the dirty data in the target cleaning area is identified based on the current image information, and the cleaning mode of the pool cleaning equipment is switched according to the dirty data, thus the cleaning mode of the pool cleaning equipment can be switched in real time, so that the working mode of the pool cleaning equipment can be matched with the dirty data in the target area, and the ineffective work of the pool cleaning equipment can be avoided, thereby the workload and the energy consumption of the pool cleaning equipment are reduced and the cleaning efficiency of the pool cleaning equipment is improved.

In one possible embodiment, the cleaning modes of the pool cleaning equipment include a first cleaning mode and a second cleaning mode, or the first cleaning mode and a third cleaning mode. The first cleaning mode includes a main cleaning mode, the second cleaning mode includes a directional cleaning mode and the third cleaning mode includes a full-coverage cleaning mode. The first cleaning mode indicates that the pool cleaning equipment roughly cleans the target cleaning area; the second cleaning mode indicates that the pool cleaning equipment performs a second cleaning on the target cleaning points in the target cleaning area; and the third cleaning mode indicates that the pool cleaning equipment performs a fine cleaning on the target cleaning area.

In one possible embodiment, the target cleaning area includes an area to be cleaned of the pool cleaning equipment, an area in front sensed by the pool cleaning equipment, or an entire pool area. Specifically, the area to be cleaned can be set by the user, obtained by the water surface sensing equipment, or automatically generated by the pool cleaning equipment based on the water surface equipment, the surrounding environment, its own status, task progress, and so on. For the entire pool area, since the sensing distance of the camera is limited, it can be finally pieced together based on the image data collected during the process of the pool cleaning equipment traveling a certain distance, or obtained based on the water surface sensing equipment. The present disclosure does not specifically limit the acquisition types of the above-mentioned cleaning areas.

In one possible embodiment, in the first cleaning mode, the distance between two adjacent parallel travelling paths of the pool cleaning equipment is larger than the cleaning width of the pool cleaning equipment during travelling and smaller than the width of the target cleaning area.

In one possible embodiment, in the third cleaning mode, the distance between two adjacent parallel travelling paths of the pool cleaning equipment is less than or equal to the cleaning width of the pool cleaning equipment during travelling.

In one possible embodiment, assuming that the pool cleaning equipment needs to clean the area to be cleaned, in the case of adopting the second cleaning mode, the pool cleaning equipment will only clean several locations in the area to be cleaned; in the case of adopting the first cleaning mode, the pool cleaning equipment can clean most areas in the area to be cleaned; in the case of third cleaning mode, the pool cleaning equipment can clean all areas in the area to be cleaned.

Figure 2:
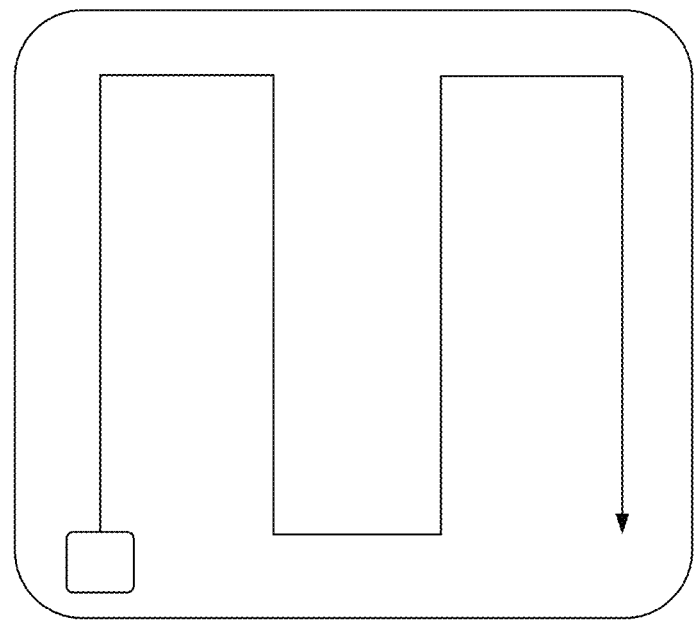
FIG. 2 is a schematic diagram of a travelling path of the pool cleaning equipment in the first cleaning mode according to an embodiment of the application.
Figure 3:
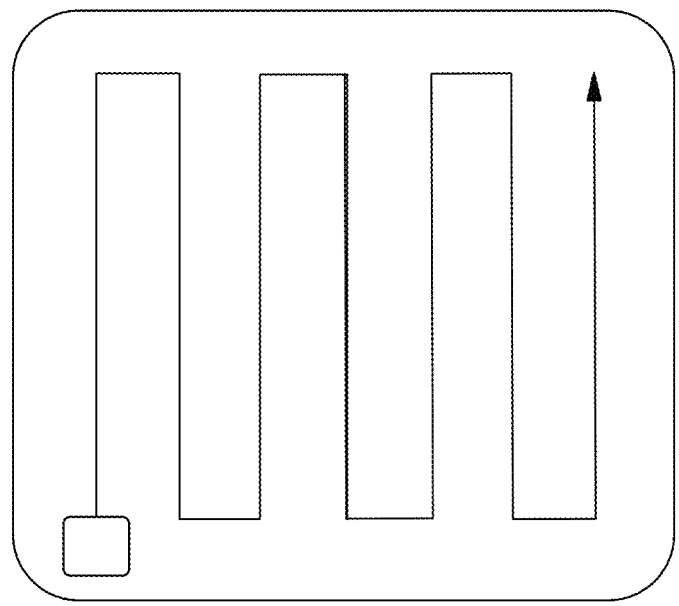
FIG. 3 is a schematic diagram of a travelling path of the pool cleaning equipment in the third cleaning mode according to an embodiment of the application.

Referring to FIG. 2 and FIG. 3, in one possible embodiment, it is assumed that the pool cleaning equipment travels in a zigzag pattern both in the first cleaning mode and the third cleaning mode, and the path spacing in the first cleaning mode is greater than that in the third cleaning mode. Then for the same area to be cleaned, the steering frequency and steering times of the first cleaning mode are less than those of the third cleaning mode.

Figure 4:
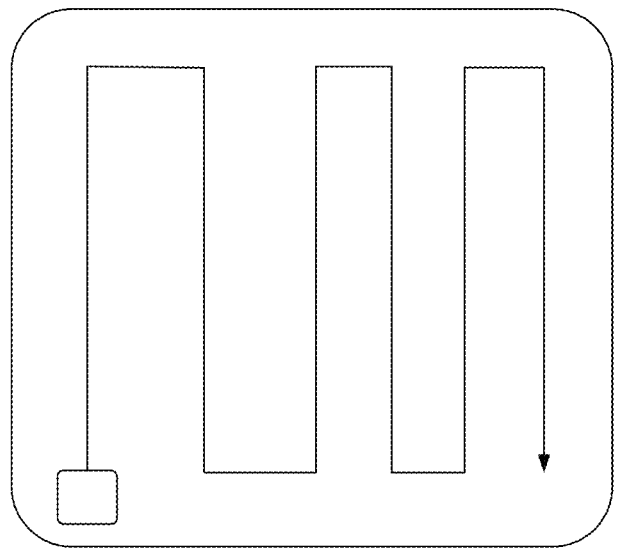
FIG. 4 is a schematic diagram of travelling path of the pool cleaning equipment during a mode switching according to an embodiment of the application.

In one possible embodiment, the travelling path of the pool cleaning equipment after switching from the first cleaning mode to the third cleaning mode is shown in FIG. 4.

Figure 5:
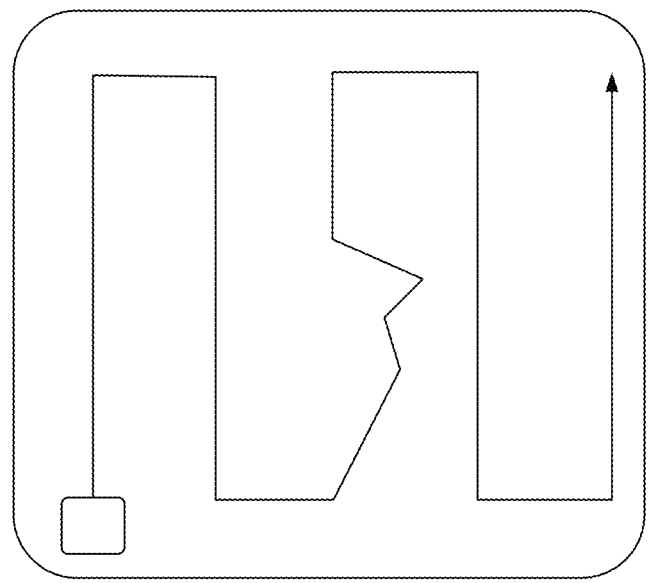
FIG. 5 is a schematic diagram of travelling path of the pool cleaning equipment during another mode switching according to an embodiment of the application.

In one possible embodiment, the pool cleaning equipment switches from the first cleaning mode to the second cleaning mode, and switches back to the first cleaning mode after the second cleaning mode is finished, the travelling path is shown in FIG. 5.

In one possible embodiment, S1003 includes the cleaning mode of the pool cleaning equipment being switched from the first cleaning mode to the second cleaning mode or the third cleaning mode according to the dirty degree information.

In one possible embodiment, when the dirt degree information indicates that the dirt in the target cleaning area satisfies a first condition, the cleaning mode of the pool cleaning equipment is switched from the first cleaning mode to the second cleaning mode.

In one possible embodiment, the first condition includes the occupied area of sediment pollutants is less than the first preset area, and/or the amount of other pollutants is less than the first preset amount, wherein other pollutants include but are not limited to plastic pollutants and large pollutants.

In one possible embodiment, when the dirt degree information indicates that the dirt in the target cleaning area satisfies a second condition, the cleaning mode of the pool cleaning equipment is switched from the first cleaning mode to the third cleaning mode.

In one possible embodiment, the second condition includes the occupied area of sediment pollutants is larger than a second preset area, and/or the amount of other pollutants is larger than a second preset amount, wherein the second preset area is greater than or equal to the first preset area and the second preset amount is greater than or equal to the first preset amount.

In one possible embodiment, the pool cleaning equipment is switched from the first cleaning mode to the second cleaning mode or the third cleaning mode according to the dirty degree information, so as to ensure comprehensive cleaning when the first condition is satisfied, fixed-point cleaning when the second condition is satisfied, and normal local cleaning when neither the first condition nor the second condition is satisfied, thereby reducing the workload of the pool cleaning equipment, reducing the energy consumption of the pool cleaning equipment and improving the cleaning efficiency of the pool cleaning equipment.

In one possible embodiment, the second cleaning mode includes performing local path planning based on the dirt position information, and controlling the pool cleaning equipment to move from the currently located area to the area where the dirt is located for fixed-point cleaning based on the local path planning.

In one possible embodiment, assuming that the dirty data in the target area indicates that the pollutant 1 exists in the location area B and the pollutant 2 exists in the location area D, the pool cleaning equipment will pass through the location area A, the location area B, the location area C, the location area D and the location area E in sequence under the first cleaning mode of the pool cleaning equipment, if no path planning is performed; then after the pool cleaning equipment is switched from the first cleaning mode to the second cleaning mode, the travelling path of the pool cleaning equipment after the local path planning will change, for example, the pool cleaning equipment will move from the current location area A to the location area B, and then move to the location area D from the location area B.

In one possible embodiment, by performing local path planning based on dirty position information, the pool cleaning equipment can realize fixed-point cleaning of the location to be cleaned, thereby avoiding the ineffective work of the pool cleaning equipment, reducing the workload and the energy consumption of the pool cleaning equipment and improving the cleaning efficiency of the pool cleaning equipment.

In one possible embodiment, the step of performing local path planning based on the dirty location information includes updating the map data of the pool based on the dirty location information, and planning the local path based on the updated map data.

In one possible embodiment, the pool cleaning equipment includes a storage module for storing map data of the pool to be cleaned; the location information of the dirt represents the specific location area of the dirty area.

In one possible embodiment, the dirty location information can be acquired by identifying the current image information; specifically, it can be identified based on the reference objects included in the current image information, such as the color of the pool wall.

In one possible embodiment, the dirty location information can be acquired by learning and identifying the current image information through the deep learning model.

In one possible embodiment, assuming that the map data of the pool includes location area A-location area N, the target cleaning area is the area in the direction in which the pool cleaning equipment is travelling, the target cleaning area is location area A-location area E, and the dirty location information indicates that the dirt is located in location area B and location area D, then the map data can be updated and the location areas B and D can be marked in the map data.

In one possible embodiment, since the pool cleaning equipment does not know where it is located, the pool cleaning equipment can perform local path planning based on the pre-stored map data by updating the map data of the pool based on the dirty location information, so as to make the local path planning more accurate and improve the cleaning efficiency of the pool cleaning equipment.

In one possible embodiment, the local path includes a path of the pool cleaning equipment travelling along an edge of the pool or a path closest to the dirt for the pool cleaning equipment.

In one possible embodiment, under the condition that the pool cleaning equipment acquires the information of its own current location area, the path closest to the dirt in the current location area is directly determined as the local path.

In one possible embodiment, under the condition that the dirty position information indicates a plurality of dirty location areas, the path closest to the dirt is determined based on the current location area and the distance between any two of the plurality of dirty location areas.

In one possible embodiment, assuming that the target cleaning area includes the location areas A-E, and the dirty location information indicates that the dirt is located in the location area B and the location area D, the pool cleaning equipment can know that its current location area is the location area C, and the first distance length is greater than the second distance length, wherein the first distance length refers to the sum of the distance length of the location area C to the location area B and the distance length of the location area B to the location area D, and the second distance length refers to the sum of the distance length of the location area C to the location area D and the distance length of the location area D to the location area B. It can be seen that the shortest path of the pool cleaning equipment to the dirt is the path corresponding to the second distance length, that is, the path along which the pool cleaning equipment passes through the location area C, location area D and location area B in sequence.

In one possible embodiment, under the condition that the pool cleaning equipment cannot acquire its current location area, the pool cleaning equipment is controlled to travel along the edge of the pool until the pool cleaning equipment acquires its current position area.

In one possible embodiment, when the pool cleaning equipment is travelling along the edge of the pool, the location area of the pool cleaning equipment is determined based on the image information collected in real time.

In one possible embodiment, the location area of the pool cleaning equipment can be determined based on reference information in the collected image information, including but not limited to iconic items and iconic colors. For example, the iconic items can be the base station, and the iconic colors can only exist in the target location area.

In one possible embodiment, the location area of the pool cleaning equipment can also be determined based on the information sent by the base station.

In one possible embodiment, by planning the path locally, travelling along the edge or determining the shortest distance, the path planning accuracy of the pool cleaning equipment moving to the dirty location area can be improved, and the cleaning efficiency of the pool cleaning equipment can be improved.

In one possible embodiment, after the second cleaning mode or the third cleaning mode is completed, the pool cleaning equipment returns to the first cleaning mode.

In one possible embodiment, the pool cleaning equipment returns to the first cleaning mode after the second cleaning mode or the third cleaning mode is completed, so that the pool cleaning equipment can traverse the whole pool to be cleaned in the first cleaning mode, thereby improving the cleaning reliability and integrity of the pool cleaning equipment.

In one possible embodiment, it is assumed that the target cleaning areas are location area A-location area E, and at location area B, the pool cleaning equipment is switched from the first cleaning mode to the second cleaning mode or the third cleaning mode; after the second cleaning mode or the third cleaning mode is completed, the pool cleaning equipment is located in the location area E, so it is necessary to control the pool cleaning equipment to travel from the location area E to the location area B at this time.

In one possible embodiment, controlling the pool cleaning equipment to return to the location area to which the first cleaning mode is applied includes controlling the pool cleaning equipment to return to the nearest location area in the first cleaning mode.

In one possible embodiment, by controlling the pool cleaning equipment to return to the nearest location area in the first cleaning mode, the travel path of the pool cleaning equipment is prevented from being too far away, thereby improving the cleaning efficiency of the pool cleaning equipment and reducing the energy consumption of the pool cleaning equipment.

In one possible embodiment, the cleaning mode of the pool cleaning equipment is switched back to the first cleaning mode under the condition that the pool cleaning equipment returns to the nearest location area in the first cleaning mode.

In one possible embodiment, it is assumed that the target cleaning areas are location area A-location area E, and at location area B, the pool cleaning equipment is switched from the first cleaning mode to the second cleaning mode or the third cleaning mode; after the second cleaning mode or the third cleaning mode is ended, the pool cleaning equipment is located in the location area E. At this time, the nearest location area in the first cleaning mode is the location area C, so it is necessary to control the pool cleaning equipment to travel from the location area E to the location area C.

In one possible embodiment, identifying the dirty data based on the current image information includes comparing the current image information with the preset image information, wherein the preset image information may include the image information without dirt, and the preset image information may also include dirty image information, so as to compare and determine the kind of dirt, etc.

In one possible embodiment, by comparing and identifying the dirty data in the current image information, the processing flow of the dirty data identification can be simplified, and the identification accuracy of the dirty data can be improved, thereby improving the cleaning reliability of the pool cleaning equipment.

In another specific embodiment of the application, the dirty data identification can also include inputting the current image information into a dirty data identification model, and determining the dirty data corresponding to the current image information, wherein the dirty data identification model is a model acquired by deep learning based on preset image information and preset dirty data.

In another embodiment of the application, S1002 may include:

S10021, feature extraction is performed on the current image information to acquire a plurality of target feature points; the feature extraction can be performed to extract the feature based on each pixel, or it can be performed based on feature extraction deep learning algorithm; the target feature points can represent the characteristics of objects in the pool, for example, the target feature points can represent the corresponding characteristics of obstacles, garbage and pool walls.

S10022, when the number of the plurality of target feature points is greater than the preset feature number, the current image information is semantically segmented to determine the target semantic information except the pool wall information and the pool bottom information; the semantic segmentation aims to associate the pixels in the current image information with the target category based on the deep learning algorithm, to realize the calibration and classification of the target feature points. Specifically, the semantic segmentation can divide the target feature points into characteristic information such as the pool wall information, the pool bottom information and the dirty data. The target semantic information includes, but is not limited to, the dirty data and the obstacle data.

S10023, a semantic recognition is performed on the target semantic information to determine the dirty data; the semantic recognition refers to determining the required information from the target semantic information, such as the dirty data.

In one possible embodiment, the dirty data is determined by the feature extraction, the semantic segmentation and the semantic recognition, so as to improve the recognition accuracy of the dirty data and further improve the cleaning reliability of the pool cleaning equipment.

The cleaning method of the pool cleaning equipment provided by the embodiment of the application has the following beneficial effects.

By acquiring the current image information of the target cleaning area, and identifying the dirty data in the target cleaning area based on the current image information, and switching the cleaning mode of the pool cleaning equipment according to the dirty data, the cleaning mode of the pool cleaning equipment can be switched in real time, so that the working mode of the pool cleaning equipment is matched with the dirty data in the target area, and the ineffective work of the pool cleaning equipment can be avoided, thereby reducing the workload and the energy consumption of the pool cleaning equipment and improving the cleaning efficiency of the pool cleaning equipment.

The embodiment of the application also provides a pool cleaning equipment, which includes: an image acquisition unit configured to acquire image information of a target cleaning area; a processing unit configured to identify image information to acquire dirty data; and a control unit configured to control the pool cleaning equipment to switch the cleaning mode according to the dirt data.

In one possible embodiment, the cleaning modes include a first cleaning mode and a second cleaning mode, or the first cleaning mode and a third cleaning mode, and the control unit is configured to control the pool cleaning equipment to switch from the first cleaning mode to the second cleaning mode or the third cleaning mode according to the dirt data.

In one possible embodiment, the target cleaning area comprises an area to be cleaned of the pool cleaning equipment, an area in front sensed by the pool cleaning equipment, or an entire pool area In one possible embodiment, in the first cleaning mode, the distance between two adjacent parallel travel paths of the pool cleaning equipment is larger than the cleaning width of the pool cleaning equipment during travelling and smaller than the width of the target cleaning area.

In one possible embodiment, in the third cleaning mode, the distance between two adjacent parallel travelling paths of the pool cleaning equipment is less than or equal to the cleaning width of the pool cleaning equipment during travelling.

The embodiment of the application also provides an electronic device, which includes a processor and a memory, wherein at least one instruction or at least one program is stored in the memory, and the at least one instruction or at least one program is loaded and executed by the processor to realize the cleaning method of the pool cleaning equipment.

The memory can be used to store software programs and modules, and the processor executes various functional applications and data processing by running the software programs and modules stored in the memory. The memory can mainly include a storage program area and a storage data area, wherein the storage program area can store an operating system, application programs required by functions, and the like; The storage data area can store data created according to the use of equipment, etc. In addition, the memory may include high-speed random access memory and non-volatile memory, such as at least one hard disk storage device, flash memory device or other volatile solid-state storage devices. Accordingly, the memory may also include a memory controller to provide access to the memory by the processor.

Figure 6:
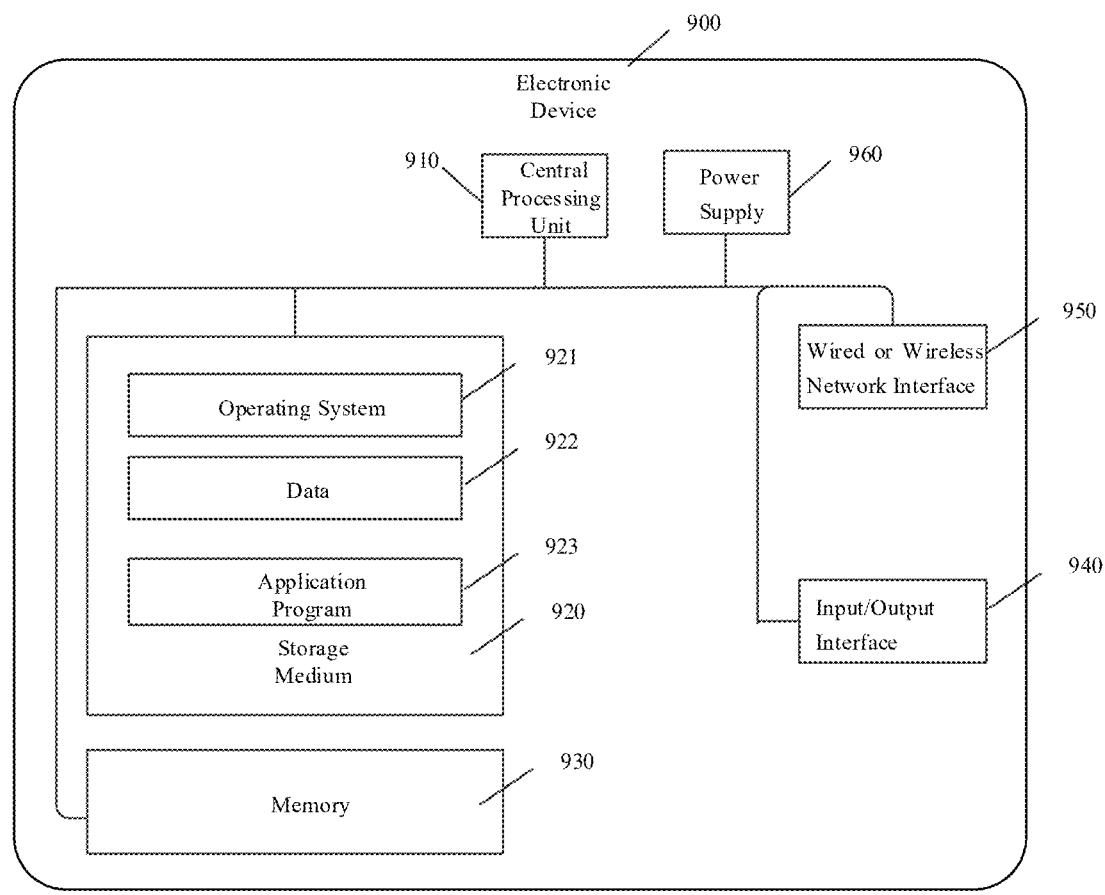
FIG. 6 is a hardware structure block diagram of the pool cleaning equipment according to an embodiment of the application.

The method embodiment provided by the embodiment of the application can be executed in electronic devices such as mobile terminals, computer terminals, servers or similar computing devices. FIG. 6 is an electronic device provided by an embodiment of the present application. As shown in FIG. 6, the electronic device 900 may have great differences due to different configurations or performances, and may include one or more Central Processing Units (CPU) 910 (the processor 910 may include but not limited to a processing device such as a microprocessor MCU or a programmable logic device FPGA), a memory 930 for storing data, and one or more storage media 920 (e.g., one or more) for storing applications 923 or data 922. The memory 930 and the storage medium 920 may be temporary storage or permanent storage. The program stored in the storage medium 920 may include one or more modules, and each module may include a series of instruction operations in the electronic device. Further, the central processor 910 can be arranged to communicate with the storage medium 920 and execute a series of instruction operations in the storage medium 920 on the electronic device 900. The electronic device 900 may also include one or more power supplies 960, one or more wired or wireless network interfaces 950, one or more input/output interfaces 940, and/or one or more operating systems 921, such as Windows Server™, Mac OS pool cleaning Method™, Uni pool cleaning Method™, Linu pool cleaning Method™, Free BSDT™, and so on.

The input-output interface 940 can be used to receive or send data via a network. The specific example of the network described above may include a wireless network provided by a communication provider of the electronic device 900. In one example, the input/output interface 940 includes a Network Interface Controller (NIC), which can be connected with other network devices through a base station so as to communicate with the Internet. In one example, the input-output interface 940 may be a Radio Frequency (RF) module, which is used to communicate with the Internet in a wireless manner.

Those skilled in the art can understand that the structure shown in FIG. 6 is only schematic, and it does not limit the structure of the above-mentioned electronic device. For example, the electronic device 900 may also include more or fewer components than shown in FIG. 6, or have a different configuration from that shown in FIG. 6.

The embodiment of the application also provides a storage medium, in which at least one instruction or at least one program is stored, and the at least one instruction or at least one program is loaded and executed by a processor to realize the cleaning method of the pool cleaning equipment as described above.

The above description has fully disclosed the specific embodiments of the present application. It should be pointed out that any changes made by people familiar with this field to the specific embodiments of this application do not depart from the scope of the claims of this application. Accordingly, the scope of the claims of this application is not limited to the foregoing specific embodiments.

The invention claimed is:

1. A cleaning method of pool cleaning equipment, comprising:
   acquiring current image information of a target cleaning area;
   identifying dirty data based on the current image information; and
   switching cleaning mode of the pool cleaning equipment according to the dirty data, wherein the cleaning mode comprises a first cleaning mode and a second cleaning mode, or the first cleaning mode and a third cleaning mode; the switching cleaning mode of the pool cleaning equipment according to the dirty data comprises:
   switching the cleaning mode of the pool cleaning equipment from the first cleaning mode to the second cleaning mode or the third cleaning mode according to the dirty degree information.

2. The cleaning method of pool cleaning equipment according to claim 1, wherein the dirty data comprises dirty degree information and dirty position information.

3. The cleaning method of pool cleaning equipment according to claim 2, wherein the dirty degree information comprises type, occupied area, occupied volume or quantity of pollutants.

4. The cleaning method of pool cleaning equipment according to claim 1, wherein the first cleaning mode comprises a main cleaning mode, the second cleaning mode comprises a directional cleaning mode and the third cleaning mode comprises a full-coverage cleaning mode.

5. The cleaning method of pool cleaning equipment according to claim 1, wherein the second cleaning mode comprises performing a local path planning based on the dirty position information, and controlling the pool cleaning equipment to move from a currently located area to an area where dirt is located for fixed-point cleaning based on the local path planning.

6. The cleaning method of the pool cleaning equipment according to claim 5, wherein the performing the local path planning based on the dirty position information comprises updating map data of pool based on the dirty position information, and performing the local path planning based on the updated map data.

7. The cleaning method of pool cleaning equipment according to claim 5, wherein the local path comprises a path of the pool cleaning equipment traveling along an edge of the pool or a path closest to the dirt for the pool cleaning equipment.

8. The cleaning method of pool cleaning equipment according to claim 1, further comprising:

controlling the pool cleaning equipment to return to an area to which the first cleaning mode is applied after the second cleaning mode or the third cleaning mode is completed.

9. The cleaning method of pool cleaning equipment according to claim 1, wherein the identifying the dirty data based on the current image information comprises comparing the current image information with preset image information.

10. The cleaning method of pool cleaning equipment according to claim 1, wherein the identifying the dirty data based on the current image information comprises:
performing feature extraction on the current image information to acquire a plurality of target feature points;
performing semantic segmentation on the current image information when the number of the plurality of target feature points is greater than a preset feature number, and determining target semantic information except pool wall information and pool bottom information; and
performing semantic recognition on the target semantic information to determine the dirty data.

11. The cleaning method of pool cleaning equipment according to claim 1, wherein in the first cleaning mode, a distance between two adjacent parallel travelling paths of the pool cleaning equipment is greater than a cleaning width of the pool cleaning equipment during travelling and less than a width of the target cleaning area.

12. The cleaning method of pool cleaning equipment according to claim 1, wherein in the third cleaning mode, a distance between two adjacent parallel travelling paths of the pool cleaning equipment is less than or equal to the cleaning width during the travelling of the pool cleaning equipment.

13. The cleaning method of pool cleaning equipment according to claim 1, wherein the target cleaning area comprises an area to be cleaned of the pool cleaning equipment, an area in front sensed by the pool cleaning equipment, or an entire pool area.

14. A pool cleaning equipment comprising:
an image acquisition unit configured to acquire current image information of a target cleaning area;
a processing unit configured to identify dirty data based on the current image information; and
a control unit configured to control the pool cleaning equipment to switch cleaning mode according to the dirty data,
wherein the cleaning mode comprises a first cleaning mode and a second cleaning mode, or the first cleaning mode and a third cleaning mode, and the control unit is configured to control the pool cleaning equipment to switch from the first cleaning mode to the second cleaning mode or the third cleaning mode according to the dirty data.

15. The pool cleaning equipment according to claim 14, wherein the first cleaning mode comprises a main cleaning mode, the second cleaning mode comprises a directional cleaning mode and the third cleaning mode comprises a full-coverage cleaning mode.

16. The pool cleaning equipment according to claim 14, wherein in the first cleaning mode, a distance between two adjacent parallel travelling paths of the pool cleaning equipment is greater than a cleaning width of the pool cleaning equipment during travelling and less than a width of the target cleaning area, in the second cleaning mode, the control unit is configured to perform a local path planning based on the dirty position information, and control the pool cleaning equipment to move from a currently located area to an area where dirt is located for fixed-point cleaning based on the local path planning and in the third cleaning mode, a distance between two adjacent parallel travelling paths of the pool cleaning equipment is less than or equal to the cleaning width during the travelling of the pool cleaning equipment.

17. The pool cleaning equipment according to claim 14, wherein the target cleaning area comprises an area to be cleaned of the pool cleaning equipment, an area in front sensed by the pool cleaning equipment, or an entire pool area.

18. The pool cleaning equipment according to claim 14, wherein the dirty data comprises dirty degree information and dirty position information.

19. A non-transitory computer-readable storage medium storing computer-readable instructions that cause a processor to:
acquire current image information of a target cleaning area;
identify dirty data based on the current image information; and
switch cleaning mode of a pool cleaning equipment according to the dirty data,
wherein the cleaning mode comprises a first cleaning mode and a second cleaning mode, or the first cleaning mode and a third cleaning mode, and the computer-readable instructions cause the processor to control the pool cleaning equipment to switch from the first cleaning mode to the second cleaning mode or the third cleaning mode according to the dirty data.

20. The non-transitory computer-readable storage medium according to claim 19, wherein the dirty data comprises dirty degree information and dirty position information.

* * * * *